United States Patent
Gupta et al.

(10) Patent No.: US 11,843,426 B2
(45) Date of Patent: Dec. 12, 2023

(54) METHOD FOR DETERMINING BEAM INTERFERENCE

(71) Applicant: Nokia Solutions and Networks Oy, Espoo (FI)

(72) Inventors: Richa Gupta, Bangalore (IN); Suresh Kalyanasundaram, Bangalore (IN); Deepak Kumar Nayak, Bangalore (IN); Rakshak Agrawal, Bangalore (IN); Shalini Gulati, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/103,597

(22) Filed: Jan. 31, 2023

(65) Prior Publication Data

US 2023/0254056 A1   Aug. 10, 2023

(30) Foreign Application Priority Data

Feb. 4, 2022   (FI) ...................................... 20225096

(51) Int. Cl.
*H04L 1/02* (2006.01)
*H04B 17/345* (2015.01)
*H04B 7/0452* (2017.01)

(52) U.S. Cl.
CPC ......... *H04B 17/345* (2015.01); *H04B 7/0452* (2013.01)

(58) Field of Classification Search
CPC ..... H04W 16/02; H04W 72/23; H04W 92/14; H04W 74/0833; H04W 16/28; H04W 52/241; H04B 7/0617; H04B 7/088

USPC ......................................... 375/267, 260, 262
See application file for complete search history.

(56) References Cited

U.S. PATENT DOCUMENTS

| | | | |
|---|---|---|---|
| 2015/0016434 A1* | 1/2015 | Luo | H04B 7/024 370/336 |
| 2017/0367003 A1* | 12/2017 | Zhang | H04W 24/02 |
| 2021/0399779 A1 | 12/2021 | Raghavan et al. | |

FOREIGN PATENT DOCUMENTS

| | | |
|---|---|---|
| EP | 3364554 A1 | 8/2018 |
| WO | WO 2016/141954 A1 | 9/2016 |
| WO | WO 2018/228697 A1 | 12/2018 |
| WO | WO 2020/083510 A1 | 4/2020 |

* cited by examiner

*Primary Examiner* — Khai Tran
(74) *Attorney, Agent, or Firm* — Harrington & Smith

(57) ABSTRACT

An apparatus including: a MIMO antenna for transmitting beamformed signals on a plurality of beams using a common frequency- and time-limited physical channel resource; circuitry for computing a beamforming gain of each beam in each sub-sector in a coverage area of said plurality of beams; circuitry for determining a beam dominance region of each beam within the coverage area of said plurality of beams; circuitry for determining, within the dominance region of each beam, an average of the beamforming gain of each of the other beams at least partially co-locating within said beam dominance region; circuitry for determining inter-beam interference estimations as an average interference of each beam from each of said other beams; and circuitry for scheduling transmissions of the beams by said MIMO antenna on said common frequency- and time-limited physical channel resource based on said inter-beam interference estimations.

18 Claims, 5 Drawing Sheets

METHOD FOR DETERMINING BEAM INTERFERENCE

TECHNICAL FIELD

The present invention relates to determining inter-beam interference.

BACKGROUND

Today's and future wireless communication systems, such as Long Term Evolution (LTE) or 5th Generation (5G), also referred to as New Radio (NR), have been envisaged to use multiple input-multiple output (MIMO) multi-antenna transmission techniques. Constantly increasing requirements for high throughput motivates the wireless communication systems, such as 5G, to use the mmWave (millimeter wave) frequencies due to available high bandwidth.

However, the usage of mmWave frequencies poses new challenges on MIMO performance. Beamformed data transmission is realized by transmitting the signal from all the elements in the antenna array in the desired direction by applying an amplitude and phase precoding/beamforming weights, i.e., beam-weights. Beamformed transmission from large antenna array in massive MIMO of a network element, such as a base station, e.g. gNodeB (gNb), provides improved signal strength to the desired user equipment (UE) but may create significant interference to other UEs, if the beams create unwanted interference in the direction of the other UEs.

Multiple users can be scheduled simultaneously on a frequency-time resource in multi-user MIMO (MU-MIMO) while transmitting beamformed signal in users' dominant direction. MU-MIMO improves system throughput by co-scheduling multiple UEs in the same slot on the same physical resource blocks (PRBs). The benefits of MU-MIMO can be realized only if the beamformed transmission towards one UE does not create too much interference to the other co-scheduled UEs.

Thus, MU-MIMO transmissions are exposed to strong co-channel interference, which is not the case for single user MIMO (SU-MIMO). However, the interference management approaches currently in use are more appropriate for SU-MIMOs than for MU-MIMOs.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising a multiple input-multiple output (MIMO) antenna for transmitting beamformed signals on a plurality of beams using a common frequency- and time-limited physical channel resource; means for computing a beamforming gain of each beam in each sub-sector in a coverage area of said plurality of beams; means for determining a beam dominance region of each beam within the coverage area of said plurality of beams; means for determining, within the dominance region of each beam, an average of the beamforming gain of each of the other beams at least partially co-locating within said beam dominance region; means for determining inter-beam interference estimations as an average interference of each beam from each of said other beams; and means for scheduling transmissions of the beams by said MIMO antenna on said common frequency- and time-limited physical channel resource based on said inter-beam interference estimations.

According to an embodiment, the apparatus comprises means for storing values of the average interference of each beam from each of said other beams values in a two-dimensional table.

According to an embodiment, the sub-sector is defined as a range of azimuth and elevation angles.

According to an embodiment, the apparatus comprises means for computing the beamforming gain for a beam i whose beam weight vector is given by the $n_{TRX}/2 \times 1$ length weight vector $b_i$ on an azimuth and elevation angle $(\theta,\phi)$ pair as $$B_i(\theta,\phi) = \|H_{\theta,\phi} b_i\|^2$$

where $H_{\theta,\phi}$ is the $1 \times n_{TRX}/2$ steering vector in the direction of $(\theta,\phi)$ and $n_{TRX}$ is the number of transmission reception units (TRX) of the transmitter.

According to an embodiment, the apparatus comprises means for determining the beam dominance region of each beam i as:

$$BDR_i = \{(\theta,\phi) \in R : B_i(\theta,\phi) \geq B_j(\theta,\phi) \forall j\}$$

where R is the set of all $(\theta,\phi)$ angle pairs in the coverage area of interest and according to a pre-defined quantization policy, and $B_x(\theta,\phi)$ is the beamforming gain of beam x at azimuth and elevation angle $\theta$ and $\phi$, respectively.

According to an embodiment, the apparatus comprises means for computing an average interference from beam $b_j$ to $b_i$ as $$I_{i\_j} = \frac{\sum_{(\theta,\phi) \in BDR_i} B_j(\theta,\phi)}{|BDR_i|},$$

where $|BDR_i|$ is the cardinality of the set $BDR_i$, or the number of entries in the set $BDR_i$.

According to an embodiment, the apparatus comprises means for using the inter-beam interference estimation for user pairing decision-making in multi-user MIMO scheduling.

According to an embodiment, the apparatus comprises means for using the inter-beam interference estimation for multi-user signal+interference noise ratio (MU-SINR) computation in MU-MIMO scheduling.

According to an embodiment, the apparatus comprises means for using the inter-beam interference estimation for scheduling user equipment that are jointly served by multiple transmission/reception points (TRPs).

A method according to a second aspect comprises transmitting, by a multiple input-multiple output (MIMO) antenna, beamformed signals on a plurality of beams using a common frequency- and time-limited physical channel resource; computing a beamforming gain of each beam in each sub-sector in a coverage area of said plurality of beams;

determining a beam dominance region of each beam within the coverage area of said plurality of beams; determining, within the dominance region of each beam, an average of the beamforming gain of each of the other beams at least partially co-locating within said beam dominance region; determining inter-beam interference estimations as an average interference of each beam from each of said other beams; and scheduling transmissions of the beams by said MIMO antenna on said common frequency- and time-limited physical channel resource based on said inter-beam interference estimations.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the interference management. While the following focuses on 5G networks, the embodiments as described further below are by no means limited to be implemented in said networks only, but they are applicable in any network implementing MU-MIMO transmissions.

Figure 1:
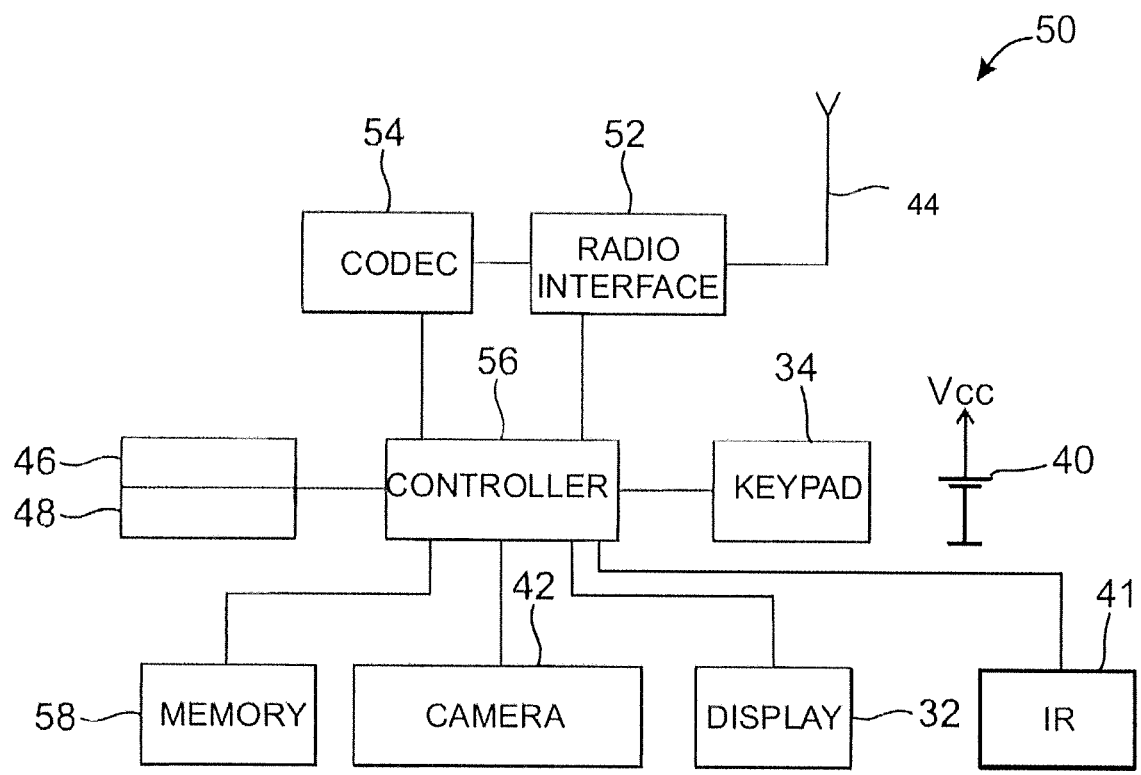
FIG. 1 shows a schematic block diagram of an apparatus for incorporating a beam distribution arrangement according to the embodiments.
Figure 2:
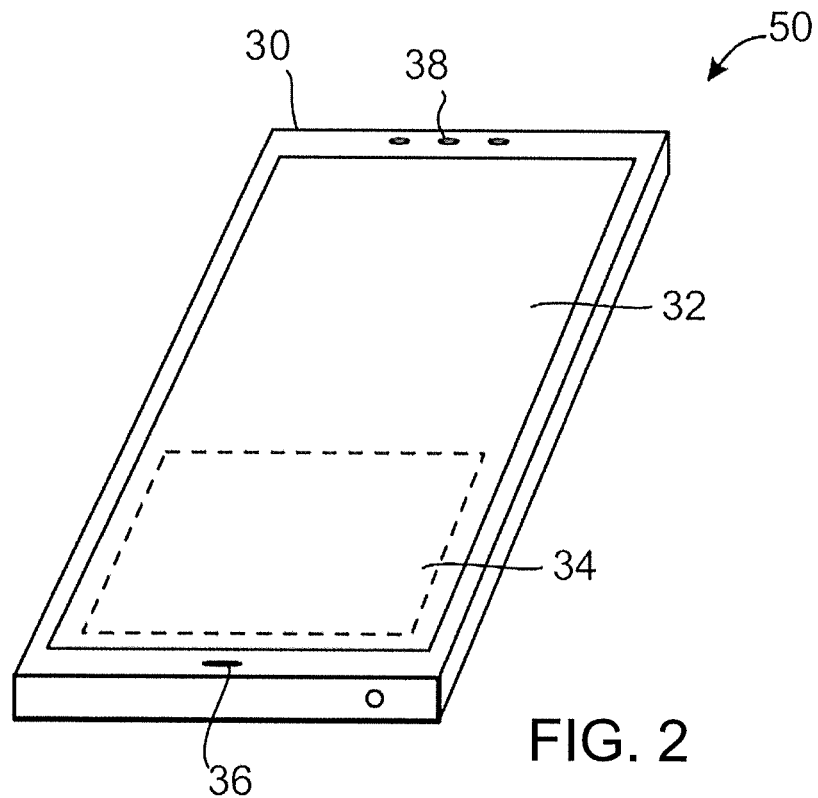
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
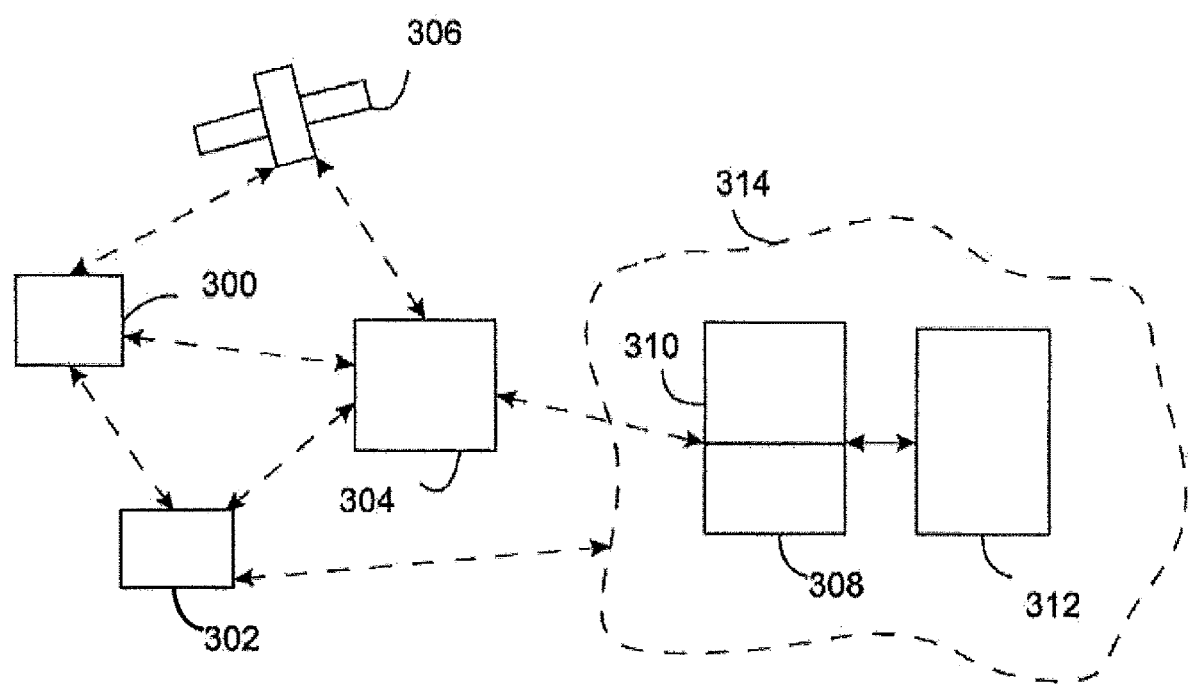
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the most important design goals has been improved metrics of reliability and latency, in addition to network resilience and flexibility.

Especially when considering the operating of the UE in the Frequency Range 2 (FR2; 24.25 GHz to 52.6 GHz) including the mmWave range, the UE implementation is expected to have multiple antenna panels (Multi-Panel UE, MPUE) to perform beam steering over a large solid angle aiming to maximize the reliability.

In FR2, both gNB and UE are expected to operate using "narrow" beams meaning that gNB operates using radiation patterns narrower than sector-wide beams and UE operates using radiation patterns narrower than omni-directional beams. Beamformed data transmission is realized by transmitting the signal from all the elements in the antenna array in the desired direction by applying an amplitude and phase precoding/beamforming weights, i.e., beam-weights. Beamformed transmission from large antenna array in massive MIMO of a network element, such as a base station (gNb), provides improved signal strength to the desired user equipment (UE) but may create significant interference to other UEs, if the beams create unwanted interference in the direction of the other UEs.

Multiple users can be scheduled simultaneously on a frequency-time resource in multi-user MIMO (MU-MIMO) while transmitting beamformed signal in users' dominant direction. MU-MIMO improves system throughput by co-scheduling multiple UEs in the same slot on the same physical resource blocks (PRBs). The benefits of MU-MIMO can be realized only if the beamformed transmission towards one UE does not create too much interference to the other co-scheduled UEs.

The reasons for the beam-based operations depend on the need for an increased array/antenna gain to compensate the higher coupling loss at mmWaves, but it also poses some technological limitations. Beam-based operation requires a good beam correspondence between the gNB and UE, which is challenging to maintain since, with very narrow beams and, therefore, a large degree of freedom in the spatial domain, it is rather sensitive to blockages and beam misalignment between gNB and UE, as well as to mobility and rotation effects of the UE.

One method of correlation computation between the beams is to perform dot product or inner-product of their beam weights, i.e., $\|b_1{}^H b_2\|^2$ where $b_1$ and $b_2$ are the $n_{TRX} \times 1$-length beam weight vectors of beams 1 and 2. Sometimes, the interference is also computed as $\|b_1'{}^H b_2'\|^2$, where $b_1'$ and $b_2'$ are the $n_{TRX}/2 \times 1$-length beam weight vectors corresponding to a single polarization. This method may result in an inaccurate estimate of interference of one beam onto another. This is because this metric only computes the interference from one beam in the bore-sight beam direction of the other beam, but the UE can be anywhere in the beam dominance direction of a beam when the UE reports that beam as the best beam.

Figure 4:
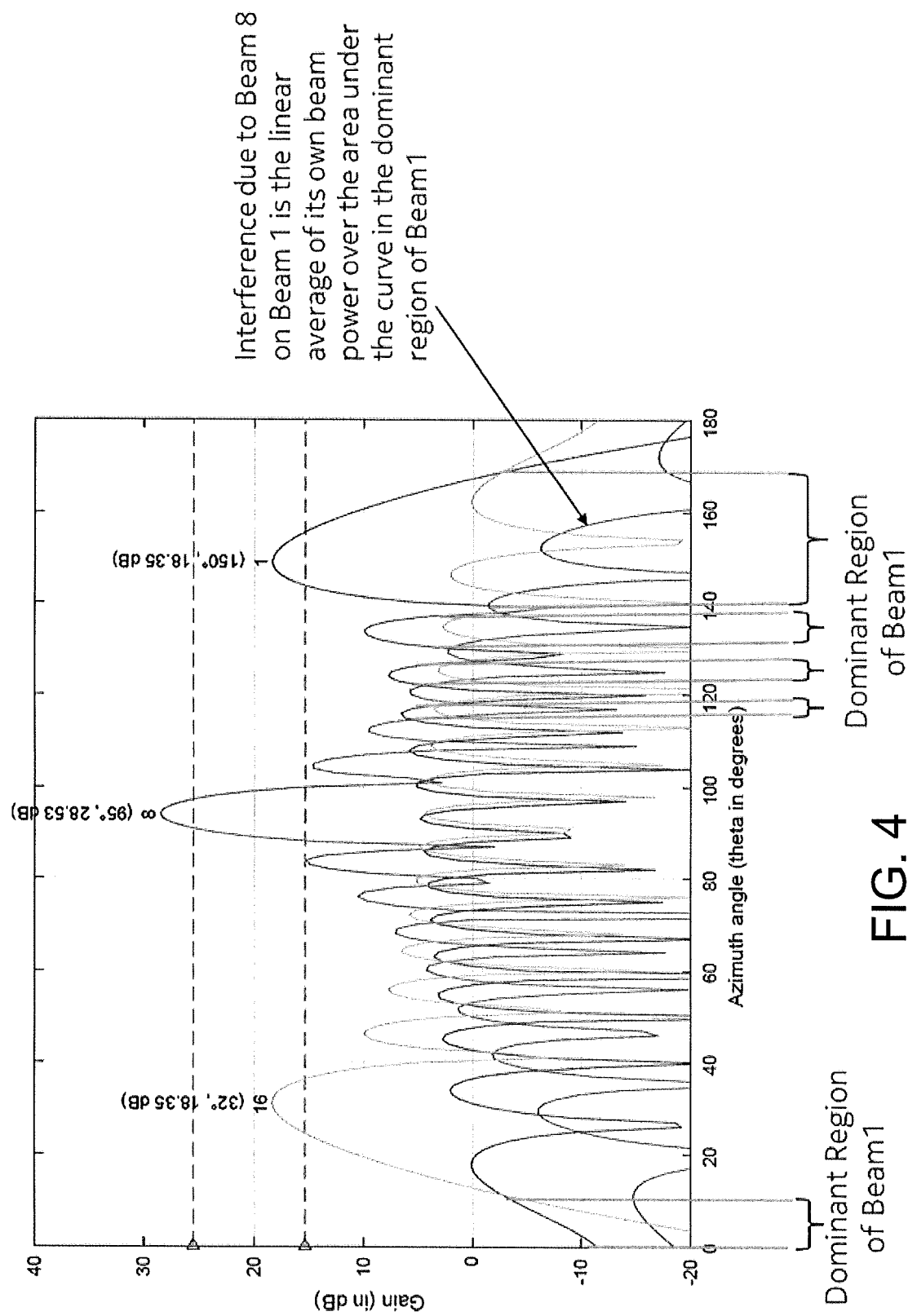
FIG. 4 shows an example of the beam gain (in dB) in the beam-space of a few beams in the azimuth direction.

FIG. 4 shows an example of the beam gain (in dB) in the beam-space of a few beams in the azimuth direction. The beam dominance region of a beam may consist of main lobe as well as some regions in its sidelobes. Interference to a beam can be due to the main lobe or sidelobe of another beam occurring in its beam dominance region. As an example, the dominance region of beam id 1 is shown below, i.e., region where beam id 1 has the largest beamforming gain compared to all other beams. As observed, even though beam 16 appears to have a null in the beam pointing direction of beam 1 and beam 8 has a larger interference in the boresight of beam 1, the side lobes of beam 16 produce more interference in the dominance region of beam 1 compared to beam 8.

It is noted that this difference is not revealed if only the inner-product of the beam weight vectors used as an indicator of the interference. Beam 16 and beam 1 will have an inner-product of 0, because the two beam weight vectors are orthogonal, and beam 8 and beam 1 will have a larger inner product. However, beam 16 causes more interference to beam 1 than beam 8. Consequently, it is not sufficient to compute the interference from the inner-product of beam weight vectors to determine correlation or interference between them, but the whole azimuth and elevation angular space needs to be considered.

In the following, an enhanced method for estimating inter-beam interference will be described in more detail, in accordance with various embodiments.

Figure 5:
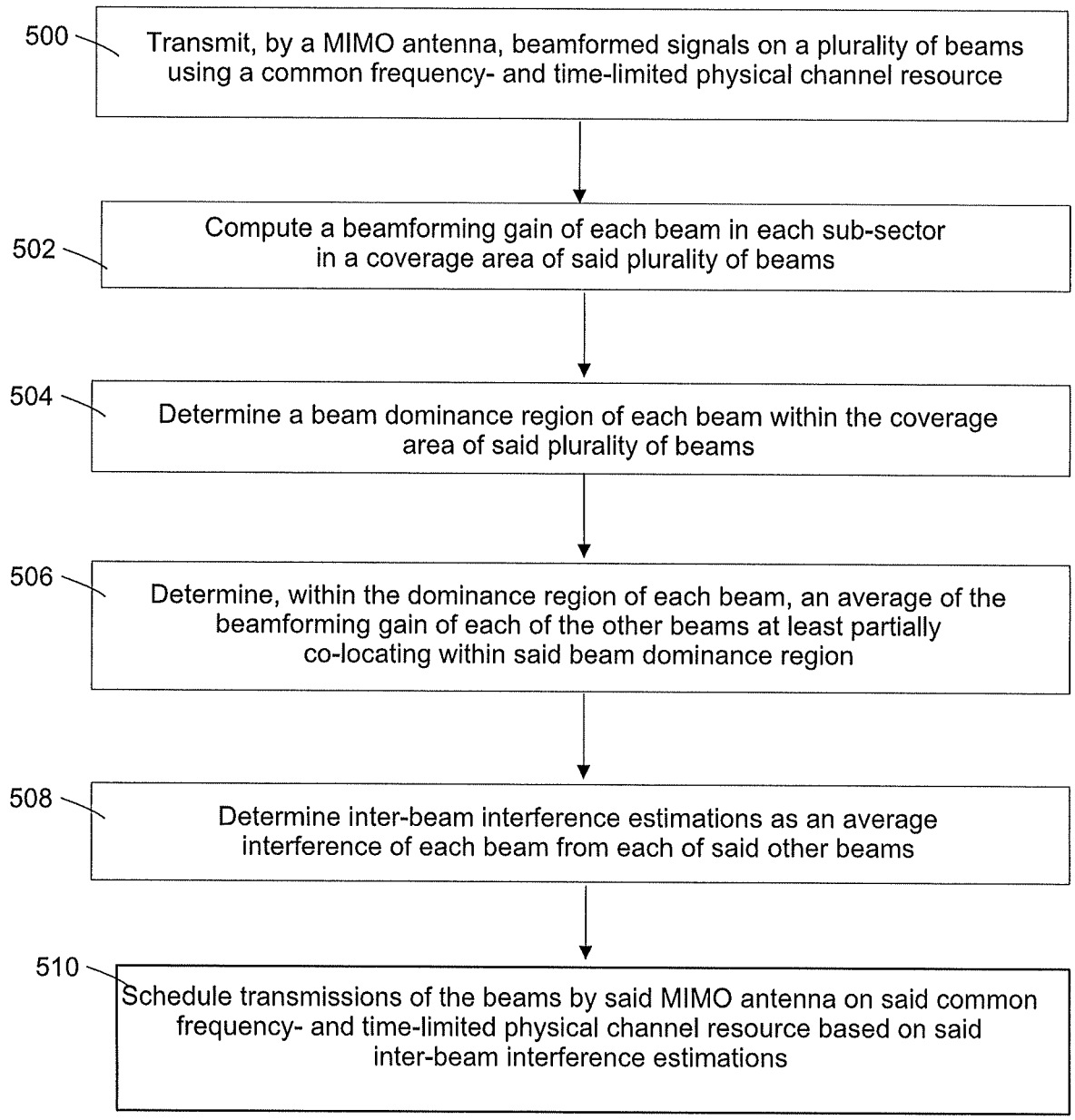
FIG. 5 shows a flow chart for estimating inter-beam interference according to an embodiment.

The method, which is disclosed in flow chart of FIG. 5 as reflecting the operation of a network element, such as an access node, for example a base station (gNb), wherein the method comprises transmitting (500), by a multiple input-multiple output (MIMO) antenna, beamformed signals on a plurality of beams using a common frequency- and time-limited physical channel resource; computing (502) a beamforming gain of each beam in each sub-sector in a coverage area of said plurality of beams; determining (504) a beam dominance region of each beam within the coverage area of said plurality of beams; determining (506), within the dominance region of each beam, an average of the beamforming gain of each of the other beams at least partially co-locating within said beam dominance region; determining (508) inter-beam interference estimations as an average interference of each beam from each of said other beams; and scheduling (510) transmissions of the beams by said MIMO antenna on said common frequency- and time-limited physical channel resource based on said inter-beam interference estimations.

Thus, the inter-beam interference is computed as the average interference power that each beam (first beam) creates on to another beam (second beam) as the average beamforming gain of the first beam in the beam dominance region of the second beam. The rationale behind this approach is that when a particular UE picks the second beam as its best beam, this may take place in any sub-sector where the second beam has the largest beamforming gain. However, the network side, for example the gNB, has no knowledge about the sub-sector(s) where the UE's dominant path resides. Therefore, it can be assumed that the UE's dominant path is equally likely to be in any sub-sector where the second beam is the dominant beam. Given this, the interference of the first beam on to the second beam is computed as the average beamforming gain of the first beam in the beam dominance region of the second beam.

According to an embodiment, the sub-sector is defined as a range of azimuth and elevation angles.

Thus, the sub-sector is an angular span of azimuth and elevation area of interest in the coverage area of a sector or multiple sectors, where the angular span may be quantized with some pre-defined granularity of azimuth and elevation angles, for example 1°. The angular span used for the computation of then beam interference may be, for example, for 120° cell opening, an angle span of −60° to +60° in azimuth and −20° to +10° in elevation, where a granularity of 1° for both is used.

In each sub-sector, the beam with highest gain for each (azimuth, elevation) angle pair can be found. The set of angles $BDR_1 = \{(az, el): B_1(az, el) \geq B_j(az, el) \forall j\}$ may be referred to as the beam-dominance region of Beam 1, where (az, el) are the azimuth and elevation angles respectively that belong to a sub-sector, i.e. the quantized set of angles in the sector coverage area, and $B_j(az, el)$ is the beamforming gain of beam j in the direction (az, el).

According to an embodiment, the method comprises storing values of the average interference of each beam from each of said other beams values in a two-dimensional table.

Hence, for each beam, in its beam dominance region, the average interference, averaged over the angles in its beam dominance region, is computed from each of said other beams. These values may be stored in a 2-D table, a simplified example of which is shown below. In the table, $I_{x\_y}$ represents average interference from beam y on beam x in the beam dominance region of beam x.

|  | Beam 1 | Beam 2 | Beam 3 | Beam 4 |
| --- | --- | --- | --- | --- |
| Beam 1 | $I_{1\_1}$ | $I_{1\_2}$ | $I_{1\_3}$ | $I_{1\_4}$ |
| Beam 2 | $I_{2\_1}$ | $I_{2\_2}$ | $I_{2\_3}$ | $I_{2\_4}$ |
| Beam 3 | $I_{3\_1}$ | $I_{3\_2}$ | $I_{3\_3}$ | $I_{3\_4}$ |
| Beam 4 | $I_{4\_1}$ | $I_{4\_2}$ | $I_{4\_3}$ | $I_{4\_4}$ |

In the following, some steps relating to the method and some of the embodiments are described more in detail in order to compute the mapping of beam-to-beam average interference.

Thus, the beam-gain of each beam is computed in each azimuth and elevation angle pair in one or more sector(s) coverage area. According to an embodiment, the beamforming gain for a beam i whose beam weight vector is given by the $n_{TRX}/2 \times 1$ length weight vector $b_i$ on an azimuth and elevation angle $(\theta, \phi)$ pair is computed as $$B_i(\theta, \phi) = \|H_{\theta, \phi} b_i\|^2$$

where $H_{\theta, \phi}$ is the $1 \times n_{TRX}/2$ steering vector in the direction of $(\theta, \phi)$ and $n_{TRX}$ is the number of transmission reception units (TRX) of the transmitter. The steering vector can be computed, for example, as specified in 3GPP 38.901 for the generation of 3D spatial channel model.

According to an embodiment, the beam dominance region of each beam i is determined as follows:

$$BDR_i = \{(\theta, \phi) \in R : B_i(\theta, \phi) \geq B_j(\theta, \phi) \forall j\}$$

where R is the set of all $(\theta, \phi)$ angle pairs in the coverage area of interest and according to a pre-defined quantization policy, and $B_x(\theta, \phi)$ is the beamforming gain of beam x at azimuth and elevation angle $\theta$ and $\phi$, respectively.

As mentioned above, within the dominance region of each beam, the average of the beam-gain of all the other beams is determined. According to an embodiment, an average interference from beam $b_j$ to $b_i$ is computed as $$I_{i\_j} = \frac{\sum_{(\theta, \phi) \in BDR_i} B_j(\theta, \phi)}{|BDR_i|},$$

where $|BDR_i|$ is the cardinality of the set $BDR_i$, or the number of entries in the set $BDR_i$.

The interference $I_{x,y}$, as calculated above, may be used in the computation of the multi-user signal+interference noise ratio (MU-SINK), Proportional Fair Scheduling (PF) metric, etc. for selection of users. The MU-SINR, in turn, may be used in the link adaptation algorithm for modulation-and-coding scheme (MCS) selection of the co-scheduled UEs.

According to an embodiment, the inter-beam interference estimation is used for user pairing decision-making in MU-MIMO scheduling. Thus, the inter-beam interference table, as shown above, can be used to co-schedule in an MU-MIMO fashion those users whose serving beams are less-interfering with each other to increase the spectral efficiency.

According to an embodiment, the inter-beam interference estimation is used for MU-SINR computation in MU-MIMO scheduling. Thus, MU-SINR is computed based on SU-SINR while accounting for the MU interference between the co-scheduled UEs. MU-SINR is used in the determination of MCS. An appropriate MCS improves the throughput by using the optimal MCS for the expected channel condition of the transmission. MU-SINR for layer $l_u$ of a user u is computed as follows:

$$\gamma_u(l_u) = \frac{\frac{SU - SINR_{l_u}}{P}}{\frac{SU - SINR_{l_u}}{P} \sum_{u' \neq u} \sum_{l_{u'}} I_{l_u\_l_{u'}} + 1}$$

where P is the total number of co-scheduled UEs and u' denotes the index of a co-scheduled interfering UE. SU-SINR is computed by the UE assuming full base station transmission power is allocated to the UE of interest, but during the MU-MIMO transmission, the transmit power is divided equally among the P co-scheduled UEs. The interference of the beam used for transmission of layer $l_{u'}$ of user u' on the beam used for layer $l_u$ of user u is $I_{l_u,l_{u'}}$.

According to an embodiment, the inter-beam interference estimation may also be used for scheduling users that are jointly served by multiple transmission/reception points (TRPs). The UEs that are in the coverage of multiple TRPs (cells) are served by the beams from these TRPs that have the highest interference to each other. As a result, the performance of the UEs is improved when served by multiple TRPs using their most overlapping beams.

Figure 6A:
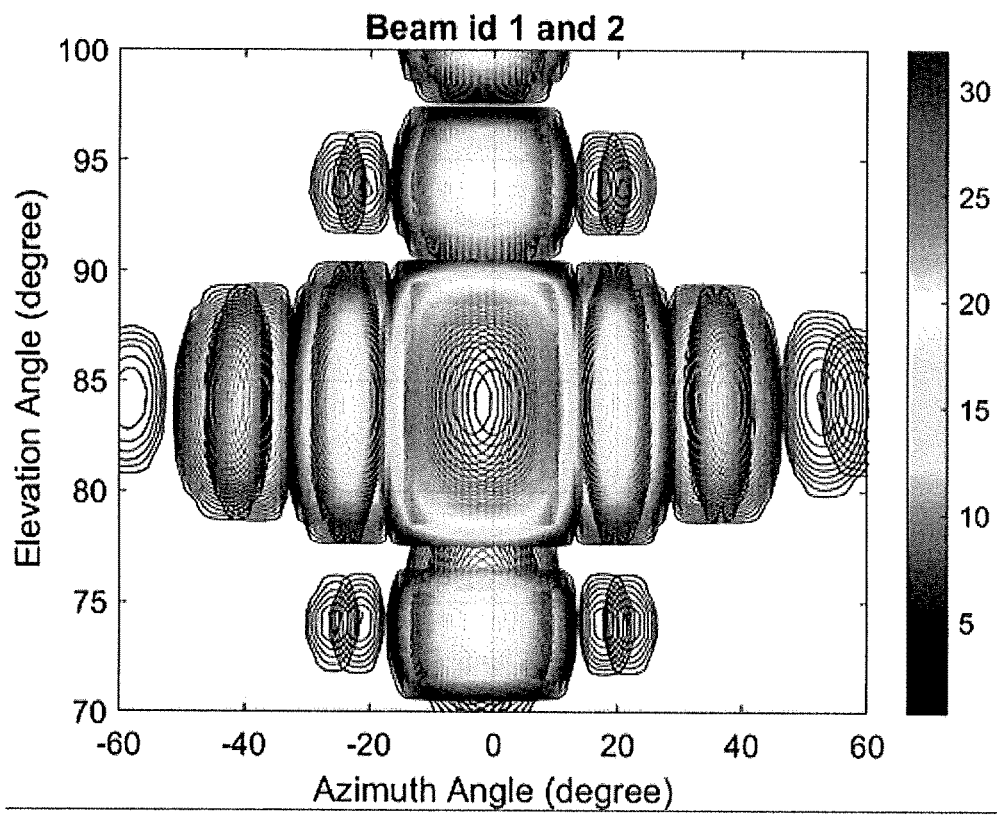
FIGS. 6a and 6b show examples of beam-pairs and their average interference (in linear) in beam dominance region according to various embodiments.
Figure 6B:
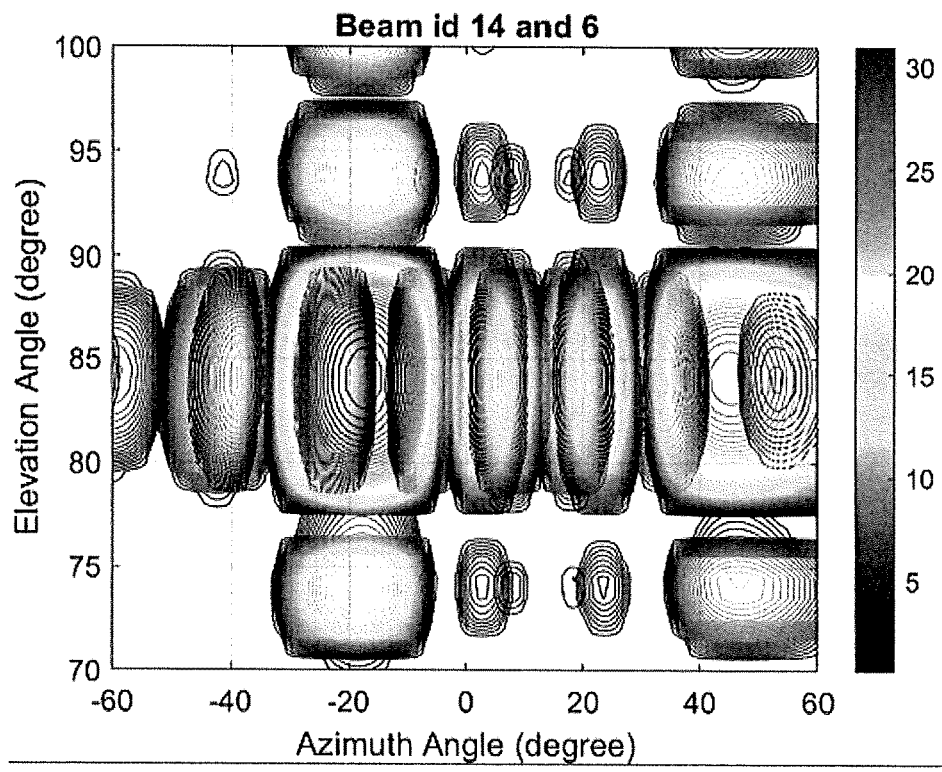

A few exemplifying plots of the beam-pairs and average interference (in linear) in beam dominance region are shown FIGS. 6a and 6b. The measurement arrangement underlying the results included an antenna array of dimension 12×8×2, where 3 adjacent radiators in vertical direction are combined to one Transmission Reception unit (TRX). There are a total 225 over-sampled DFT beams, hence a table of size 225× 225 is created to provide average interference from every beam to every other beam.

In the example shown in FIG. 6a, beam id 1 and 2 are closer to each-other in azimuth and completely overlap in elevation. Hence there is a large mutual overlap of these beams in their dominance region. The average interference of beam id 2 on beam id 1, $I_{1\_2}$=31.46 dB and beam id 1 on beam id 2, $I_{2\_1}$=31.5 dB.

In the example shown in FIG. 6b, the correlation between beams 14 and 6 shows that these two beams are sufficiently spaced apart in azimuth and hence correlation between their main lobes is insignificant. Only sidelobes of these beams produce interference in the beam-dominance region of each of the other beams. Hence the interference is low, i.e., $I_{14\_6}$=4.96 dB and $I_{6\_14}$=9.87 dB.

As illustrated by the above two examples, there may be a vast difference in the interference of different beams can be. Accordingly, accurate computation of the inter-beam interference, as defined by the method and the related embodiment, enables to significantly improve MU-MIMO gains.

An apparatus, such as a base station (gNb), according to an aspect comprises a multiple input-multiple output (MIMO) antenna for transmitting beamformed signals on a plurality of beams using a common frequency- and time-limited physical channel resource; means for computing a beamforming gain of each beam in each sub-sector in a coverage area of said plurality of beams; means for determining a beam dominance region of each beam within the coverage area of said plurality of beams; means for determining, within the dominance region of each beam, an average of the beamforming gain of each of the other beams at least partially co-locating within said beam dominance region; means for determining inter-beam interference estimations as an average interference of each beam from each of said other beams; and means for scheduling transmissions of the beams by said MIMO antenna on said common frequency- and time-limited physical channel resource based on said inter-beam interference estimations.

According to an embodiment, the apparatus comprises means for storing values of the average interference of each beam from each of said other beams values in a two-dimensional table.

According to an embodiment, the sub-sector is defined as a range of azimuth and elevation angles.

According to an embodiment, the apparatus comprises means for computing the beamforming gain for a beam i whose beam weight vector is given by the $n_{TRX}/2\times 1$ length weight vector $b_i$ on an azimuth and elevation angle $(\theta,\phi)$ pair as $$B_i(\theta,\phi)=\|H_{\theta,\phi}b_i\|^2$$

where $H_{\theta,\phi}$ is the $1\times n_{TRX}/2$ steering vector in the direction of $(\theta,\phi)$.

According to an embodiment, the apparatus comprises means for determining the beam dominance region of each beam i as:

$$BDR_i=\{(\theta,\phi)\in R: B_i(\theta,\phi)\geq B_j(\theta,\phi)\forall j\}$$

where R is the set of all $(\theta,\phi)$ angle pairs in the coverage area of interest and according to a pre-defined quantization policy.

According to an embodiment, the apparatus comprises means for computing an average interference from beam $b_j$ to $b_i$ as $$I_{i\_j} = \frac{\sum_{(\theta,\phi)\in BDR_i} B_j(\theta,\phi)}{|BDR_i|},$$

where $|BDR_i|$ is the cardinality of the set $BDR_i$, or the number of entries in the set $BDR_i$.

According to an embodiment, the apparatus comprises means for using the inter-beam interference estimation for user pairing decision-making in multi-user MIMO (MU-MIMO) scheduling.

According to an embodiment, the apparatus comprises means for using the inter-beam interference estimation for multi-user signal+interference noise ratio (MU-SINR) computation in MU-MIMO scheduling.

According to an embodiment, the apparatus comprises means for using the inter-beam interference estimation for scheduling user equipment that are jointly served by multiple transmission/reception points (TRPs).

The means as referred to herein and in related embodiments may comprise at least one processor; and at least one memory including computer program code, the at least one memory and computer program code configured to, with the at least one processor, cause the performance of the apparatus.

An apparatus according to a further aspect comprises at least one processor and at least one memory, said at least one memory stored with computer program code thereon, the at least one memory and the computer program code configured to, with the at least one processor, cause the apparatus at least to perform: transmit, by a multiple input-multiple output (MIMO) antenna, beamformed signals on a plurality of beams using a common frequency- and time-limited physical channel resource; compute a beamforming gain of each beam in each sub-sector in a coverage area of said plurality of beams; determine a beam dominance region of each beam within the coverage area of said plurality of beams; determine, within the dominance region of each beam, an average of the beamforming gain of each of the other beams at least partially co-locating within said beam dominance region; determine inter-beam interference estimations as an average interference of each beam from each of said other beams; and schedule transmissions of the beams by said MIMO antenna on said common frequency- and time-limited physical channel resource based on said inter-beam interference estimations.

A further aspect relates to a computer program product, stored on a non-transitory memory medium, comprising computer program code, which when executed by at least one processor, causes an apparatus at least to perform: transmit, by a multiple input-multiple output (MIMO) antenna, beamformed signals on a plurality of beams using a common frequency- and time-limited physical channel resource; compute a beamforming gain of each beam in each sub-sector in a coverage area of said plurality of beams; determine a beam dominance region of each beam within the coverage area of said plurality of beams; determine, within the dominance region of each beam, an average of the beamforming gain of each of the other beams at least partially co-locating within said beam dominance region; determine inter-beam interference estimations as an average interference of each beam from each of said other beams; and schedule transmissions of the beams by said MIMO antenna on said common frequency- and time-limited physical channel resource based on said inter-beam interference estimations.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
a multiple input-multiple output antenna for transmitting beamformed signals on a plurality of beams using a common frequency- and time-limited physical channel resource;
at least one processor; and
at least one memory storing instructions that, when executed with the at least one processor, cause the apparatus to perform:
computing beamforming gains of the beams in sub-sectors in a coverage area of said plurality of beams;
determining beam dominance regions of the beams within the coverage area of said plurality of beams;
determining, within the beam dominance regions of the beams, an average of the beamforming gains of other beams at least partially co-locating within said beam dominance regions;
determining inter-beam interference estimations as average interferences of the beams from said other beams; and
scheduling transmissions of the beams with said multiple input-multiple output antenna on said common frequency- and time-limited physical channel resource based on said inter-beam interference estimations.

2. The apparatus according to claim 1, wherein the instructions, when executed with the at least one processor, cause the apparatus to perform storing values of the average interferences of the beams from said other beams in a two-dimensional table.

3. The apparatus according to claim 1, wherein individual ones of the subsectors are defined as a range of azimuth and elevation angles.

4. The apparatus according to claim 3, wherein the instructions, when executed with the at least one processor, cause the apparatus to perform computing the beamforming gain for a beam i whose beam weight vector is given with an $n_{TRX}/2 \times 1$ length weight vector $b_i$ on an azimuth and elevation angle $(\theta, \phi)$ pair as $$B_i(\theta,\phi) = \|H_{\theta,\phi} b_i\|^2$$

where $H_{\theta,\phi}$ is a $1 \times n_{TRX}/2$ steering vector in a direction of $(\theta, \phi)$ and $n_{TRX}$ is a number of transmission reception units of a transmitter.

5. The apparatus according to claim 3, wherein the instructions, when executed with the at least one processor, cause the apparatus to perform determining a beam dominance region of a beam i as:

$$BDR_i = \{(\theta,\phi) \in R : B_i(\theta,\phi) \geq B_j(\theta,\phi) \forall j\}$$

where R is a set of all $(\theta, \phi)$ angle pairs in the coverage area of interest and according to a pre-defined quantization policy, and $B_x(\theta, \phi)$ is a beamforming gain of beam x at azimuth and elevation angles $\theta$ and $\phi$, respectively.

6. The apparatus according to claim 3, wherein the instructions, when executed with the at least one processor, cause the apparatus to perform computing an average interference from beam $b_j$ to beam $b_i$ as $$I_{ij} = \frac{\sum_{(\theta,\phi) \in BD} R_i^{B_j(\theta,\phi)}}{|BDR_i|},$$

where $|BDR_i|$ is a cardinality of a set of entries in a beam dominance region for a beam i, $BDR_i$, or a number of entries in the set $BDR_i$.

7. The apparatus according to claim 1, wherein the instructions, when executed with the at least one processor, cause the apparatus to perform using the inter-beam interference estimations for user pairing decision-making in multi-user multiple input-multiple output scheduling.

8. The apparatus according to claim 1, wherein the instructions, when executed with the at least one processor, cause the apparatus to perform using the inter-beam interference estimations for multi-user signal plus interference noise ratio computation in multi-user multiple input-multiple output scheduling.

9. The apparatus according to claim 1, wherein the instructions, when executed with the at least one processor, cause the apparatus to perform using the inter-beam interference estimations for scheduling user equipment that are jointly served with multiple transmission/reception points.

10. A method comprising:
- transmitting, with a multiple input-multiple output antenna, beamformed signals on a plurality of beams using a common frequency- and time-limited physical channel resource;
- computing beamforming gains of the beams in subsectors in a coverage area of said plurality of beams;
- determining beam dominance regions of the beams within the coverage area of said plurality of beams;
- determining, within the beam dominance regions of the beams, an average of beamforming gains of other beams at least partially co-locating within said beam dominance regions;
- determining inter-beam interference estimations as average interferences of the beams from said other beams; and
- scheduling transmissions of the beams with said multiple input-multiple output antenna on said common frequency- and time-limited physical channel resource based on said inter-beam interference estimations.

11. The method according to claim 10, further comprising storing values of the average interferences of the beams from said other beams in a two-dimensional table.

12. The method according to claim 10, wherein individual ones of the subsectors are defined as a range of azimuth and elevation angles.

13. The method according to claim 12, further comprising computing the beamforming gain for a beam i whose beam weight vector is given with an $n_{TRX}/2 \times 1$ length weight vector $b_i$ on an azimuth and elevation angle $(\theta, \phi)$ pair as $$B_i(\theta,\phi) = \|H_{\theta,\phi} b_i\|^2$$

where $H_{\theta,\phi}$ is a $1 \times n_{TRX}/2$ steering vector in a direction of $(\theta, \phi)$ and $n_{TRX}$ is a number of transmission reception units of a transmitter.

14. The method according to claim 12, further comprising determining a beam dominance region of a beam i as:

$$BDR_i = \{(\theta,\phi) \in R : B_i(\theta,\phi) \geq B_j(\theta,\phi) \forall j\}$$

where R is a set of all $(\theta, \phi)$ angle pairs in the coverage area of interest and according to a pre-defined quantization policy, and $B_x(\theta, \phi)$ is a beamforming gain of beam x at azimuth and elevation angles $\theta$ and $\phi$, respectively.

15. The method according to claim 12, further comprising computing an average interference from beam $b_j$ to beam $b_i$ as $$I_{i_j} = \frac{\sum_{(\theta,\phi) \in BD} R_i^{B_j(\theta,\phi)}}{|BDR_i|},$$

where $|BDR_i|$ is a cardinality of a set of entries in a beam dominance region for a beam i, $BDR_i$, or a number of entries in the set $BDR_i$.

16. The method according to claim 10, further comprising using the inter-beam interference estimations for user pairing decision-making in multi-user multiple input-multiple output scheduling.

17. The method according to claim 10, further comprising using the inter-beam interference estimations for multi-user signal plus interference noise ratio computation in multi-user multiple input-multiple output scheduling.

18. The method according to claim 10, further comprising using the inter-beam interference estimations for scheduling user equipment that are jointly served with multiple transmission/reception points.

* * * * *